G. R. WILSON & G. SMITHSON.

BRICK-MACHINE.

No. 7,076. Reissued April 25, 1876.

WITNESSES:
C. W. Connell
Alfred Clonghly.

INVENTORS
George R. Wilson
George Smithson
Blanchard & Singleton ATTORNEYS.

N. PETERS, PHOTO-LITHOGRAPHER, WASHINGTON, D. C.

UNITED STATES PATENT OFFICE.

GEORGE R. WILSON AND GEORGE SMITHSON, OF WASHINGTON, DISTRICT OF COLUMBIA, ASSIGNORS OF ONE-HALF INTEREST TO NORMAN B. JUDD.

IMPROVEMENT IN BRICK-MACHINES.

Specification forming part of Letters Patent No. 167,720, dated September 14, 1875; reissue No. 7,076, dated April 25, 1876; application filed April 12, 1876.

*To all whom it may concern:*

Be it known that we, GEORGE R. WILSON and GEORGE SMITHSON, of Washington, in the county of Washington and District of Columbia, have invented certain new and useful Improvements in Machines for Making Bricks of Clay, Coal-Dust, &c., for building, fuel, and other purposes; and we do hereby declare that the following is a full, clear, and exact description thereof, that will enable others skilled in the art to which it appertains to make and use the same, reference being had to the accompanying drawings, and to the letters of reference marked thereon, which form a part of this specification.

As a machine for making bricks for building purposes, this invention is designed to improve their manufacture by incorporating in the machine features which, in their operation and effect, nearly resemble the action and results of well-known expedients employed in the manufacture of brick by hand.

Figure 1:
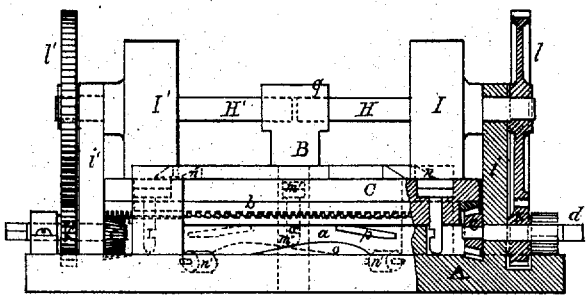
Figure 2:
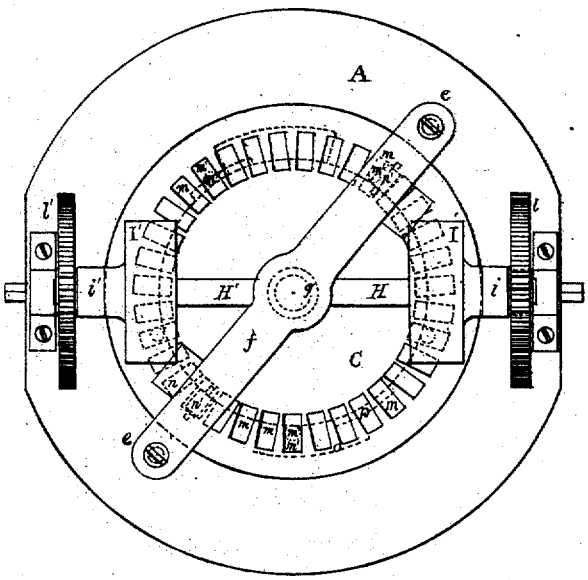

In the description of our invention which follows, due reference must be had to the accompanying drawing, in which Figure 1 is an elevation, partly in section, and Fig. 2 a plan of the invention.

A is the bed-plate of the machine, having a central step, *a*, circular in form. Centrally of the bed-plate and step is a vertical axial shaft, B, secured to the bed-plate. The mold-plate C is placed above the step *a*, and adapted to revolve around the axial shaft B by means of a large bevel-wheel, *b*, secured under the said mold-plate at its periphery, and a bevel-pinion, *c*, upon the driving-shaft *d*. Resting upon the bed-plate are pillars *e*, which sustain a yoke, *f*, the center of which is enlarged and perforated, and surrounds the axial shaft B. The top of said shaft is increased in diameter, and forms a bearing, *g*, in which rest the ends of the two shafts H and H′, the ends of which meet, as shown. The opposite ends of the shaft H H′ are supported in bearings *i i′*, which extend up from the bed-plate. A rotary motion is imparted to the shaft H from a spur-pinion, *k*, upon the driving-shaft *d*, which pinion engages with a spur-wheel, *l*, upon the said shaft H. The shaft H′ is driven in a reverse direction by the idler spur-pinion *k′*, which engages a spur-wheel, *l′*. The shaft upon which is the idler spur-pinion *k′* also carries a bevel-pinion, *c′*, which gears with the large bevel-wheel *b*. The mold-plate C is provided with the molds *m*, of the area of the brick to be made, the molds having for their beds the plungers *m′*, which have stems *m″* passing through the mold-plate. The shafts H and H′ are, respectively, provided with rollers I and I′, the purpose of which is hereinafter described.

In the following description of the operation of the machine, an explanation will be found of the parts thereof not yet alluded to. The clay which has been suitably tempered is supplied to a hopper, the mouth of which is central of the machine, and having discharge-pipes leading to the front of the rollers I I′. The mold-plate is revolved at a speed of, say, one revolution per minute, motion at the same time being given to the rollers by means of the gearing heretofore alluded to, in such a manner as to cause their peripheries to travel at a greater rate of speed than does that portion of the mold-plate C over which they are placed; the object being to cause the rollers I I′ to press the clay in the molds evenly throughout their area, and in such a manner as to cause them to be of even density in all their parts, as a consequence of which, checking, cracking, or change of form, will be prevented in burning of the bricks.

When the clay enters the molds the plunger of each is depressed to its lowest extent, leaving a height to the face of the mold-plate equal to the thickness of the brick. The plastic clay, being brought in its mold under one of the revolving rollers I or I′, is pressed firmly into the mold, as above described. From the fact that the outer portion of the mold, because of its being farther removed from the axis of the mold-plate, passes under the roller more rapidly than the inner portion, and that the motion of the roller around a horizontal axis is of a different character from that of the mold-plate, which turns around a vertical axis, the movements of the plate and roller coact to give a kind of twist to the pressure exerted, clearing the brick from the surplus clay, preventing the brick rising in the mold, and insuring its exact formation. The mold-plate continuing to revolve in the direction of the arrow, the surplus clay is swept from the face of the plate by the inclined knife or board *n*. Because of the revolution of the mold-plate, and the angle at which the yoke *f*, carrying the inclined knife or board *n*, is placed with reference to the horizontal shafting, the effect of the said board *n* upon the brick is similar to that produced in the manufacture of hand-made brick by the use of the "smearing-board," which, in the hands of the workman, is given a sort of horizontal swinging motion over the surface of the brick, the workman using one hand as a sort of pivot, around which the board is swung by the other hand. The tendency of this operation, as also that of the co-operative action of the mold-plate and roller, is to prevent the displacement of the clay in the mold, by causing the pressure to be put upon the brick gradually, and thus giving it the full shape of the mold and an even top for the last and finishing operation, which is the following: As the revolution of the mold-plate continues, the brick in the mold is brought under the yoke *f*, the under face of which perfectly coincides with the face of the mold-plate, and the stem of the plunger *m'* comes in contact with a roller, *n'*, causing the brick to be compressed between the plunger and the under side of the yoke, giving to the brick its final finish. The revolution of the mold-plate proceeding, the stem *m''* of the plunger is brought to an inclined plane, *o*, cast upon the bed-plate, which operates to raise the plunger and brick, which is then removed from the machine. As the revolution proceeds a descent in the projection *o* is reached, allowing the plunger to fall to its lowest position in time for the mold to be filled again for another operation. Should the plunger fail to fall, as described, its descent is insured by a downward-inclined rib, *p*, cast on the step *a*, entering a groove *o'*, cut in the plunger-stem. The capacity of the machine can be increased by adding to the number of its rollers, &c. The capacity of the machine herein shown is, at a speed of the mold-plate of one revolution per minute, seventy-two thousand bricks per day of ten hours, there being sixty molds in the mold-plate.

The machine, as stated above, can be used for compressing coal-dust, &c., into blocks or bricks for purposes of fuel, or for analogous uses.

We are aware that plungers in mold plates, and the method of moving them vertically by inclined planes, are not new; and that the principle of forming brick by pressure in molds revolving around a vertical shaft is also not new; but

What we claim as new, and wish to secure by Letters Patent of the United States, is—

1. A machine for making bricks, combining in its construction a mold-plate revolving around a vertical axis, and pressing-rollers revolving around horizontal axes, said rollers being connected to the mold-plate substantially as described, whereby a motion is given to their peripheries which is greater than that given to that portion of the plate over which they are placed, substantially as and for the purpose set forth.

2. The arrangement of the rollers I I', having peripheries of equal diameters throughout, at right angles to the axis of the mold-plate C, whereby a shearing or sliding motion is given to the clay under said rollers, by which all the surplus material is removed from the pressed brick, substantially as set forth.

3. The mold-plate C, provided with plungers *m'*, having stems *m''*, and grooves *o'*, combined with the rollers I I' and bed-plate A, having a step, *a*, inclined planes *o*, and ribs *p*, substantially as and for the purposes herein specified.

4. The combination of the mold-plate C, yoke *f*, plungers and stems *m' m''*, and rollers *n'*, with the rollers I I', revolving around horizontal axes, substantially as specified, and for the purposes set forth.

5. The mold-plate C, and rollers I I', combined with the yoke *f*, placed at an angle, as described, and inclined knives or boards *n*, substantially as and for the purposes herein specified.

In testimony that we claim the foregoing we have hereunto set our hands this 10th day of April, 1876.

G. R. WILSON.
GEORGE SMITHSON.

Witnesses:
C. M. CONNELL,
ALFRED CLOUGHLY.